United States Patent [19]

Stanczyk

[11] Patent Number: 4,671,007
[45] Date of Patent: Jun. 9, 1987

[54] FISHING LURE DEVICE

[76] Inventor: William G. Stanczyk, 501 Peak Blvd., #103, Muskogee, Okla. 74401

[21] Appl. No.: 708,374

[22] Filed: Mar. 6, 1985

Related U.S. Application Data

[63] Continuation of Ser. No. 456,565, Jan. 10, 1983, abandoned.

[51] Int. Cl.⁴ .............................................. A01K 85/00
[52] U.S. Cl. .................................. 43/42.53; 43/42.11; 43/42.13; 43/42.26; 43/42.74; 140/102
[58] Field of Search ................. 43/42.1, 42.11, 43/42.12, 42.14, 42.08, 42.09, 42.13, 42.26, 42.72, 42.74; 140/102

[56] References Cited

U.S. PATENT DOCUMENTS

| | | | |
|---|---|---|---|
| 556,318 | 3/1896 | Roux | 140/102 |
| 679,433 | 7/1901 | Sisson | 140/102 |
| 1,227,325 | 5/1917 | Schilling | 43/42.74 |
| 2,234,588 | 3/1941 | Cope | 43/42.74 |
| 2,282,681 | 5/1942 | Stotz | 140/102 |
| 2,615,275 | 10/1952 | DeMello | 43/42.74 |
| 2,759,290 | 8/1956 | Strausser | 43/42.74 |
| 2,769,270 | 11/1956 | Williams | 43/42.74 |
| 2,868,237 | 1/1959 | Larkin | 140/102 |
| 3,270,458 | 9/1966 | McAfee | 43/42.74 |
| 3,500,573 | 3/1970 | Hudson | 43/42.11 |
| 3,828,463 | 8/1974 | Perrin | 43/42.11 |
| 3,935,660 | 2/1976 | Plew | 43/42.53 |
| 4,003,154 | 1/1977 | Carver | 43/42.13 |
| 4,011,681 | 3/1977 | Johnson | 43/42.11 |
| 4,012,862 | 3/1977 | Dubois | 43/42.11 |
| 4,209,932 | 7/1980 | Pate | 43/42.11 |
| 4,329,804 | 5/1982 | Brown | 43/42.09 |

OTHER PUBLICATIONS

H & H Lure Field & Stream, May 1955.

Primary Examiner—Nicholas P. Godici
Assistant Examiner—K. Rowan
Attorney, Agent, or Firm—Head, Johnson & Stevenson

[57] ABSTRACT

A multiple fishing lure fastener comprising a single continuous wire structure that is bent into a generally V-shaped configuration having a bent eyelet at each end of the V for attaching a pair of artificial lures and a twisted figure eight wire structure at the point or apex of the V for attaching the fishing line and a third artificial lure or spinner.

1 Claim, 15 Drawing Figures

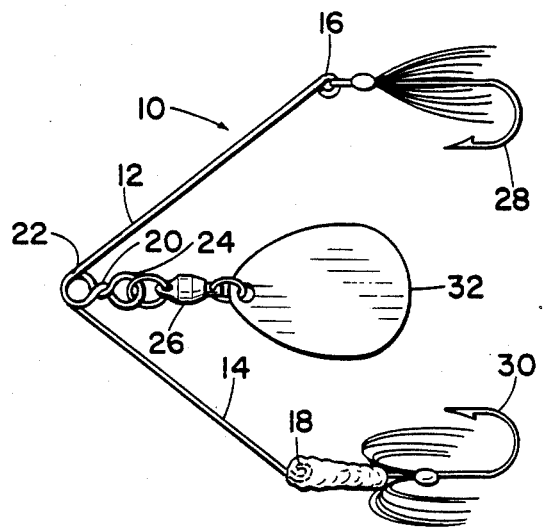
Fig. 1
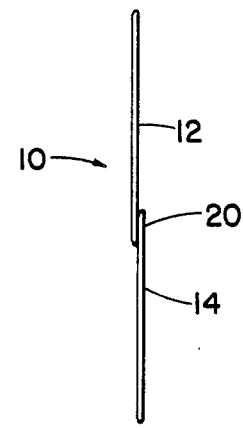
Fig. 3
Fig. 11
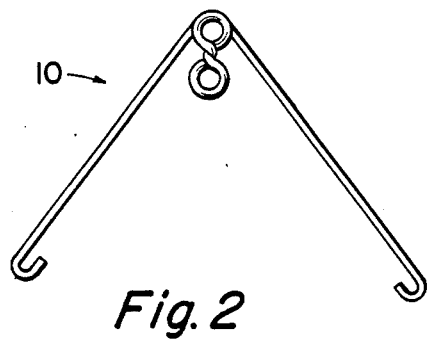
Fig. 2
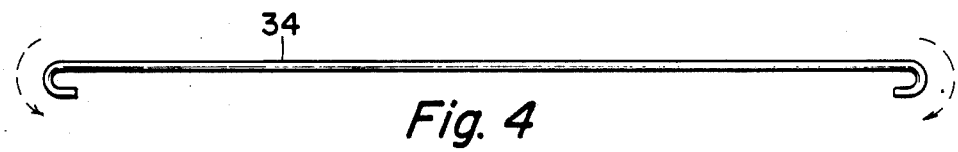
Fig. 4
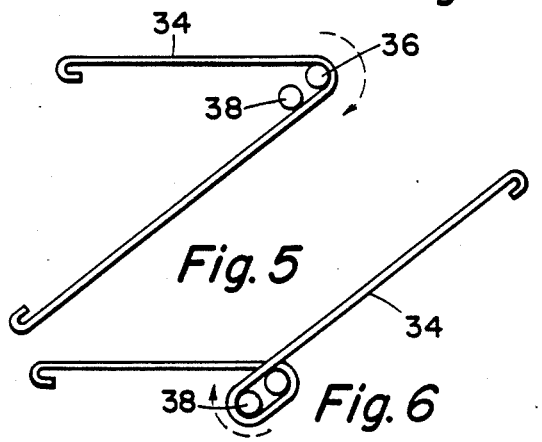
Fig. 5
Fig. 6
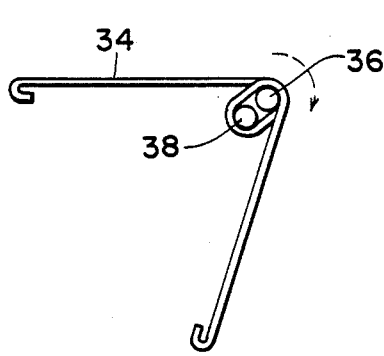
Fig. 7

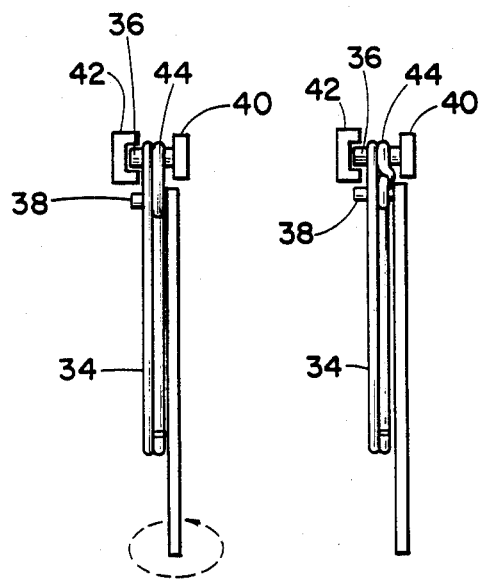
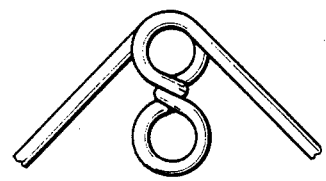
Fig. 8    Fig. 9
Fig. 10
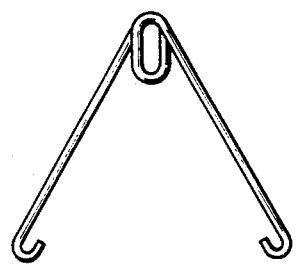
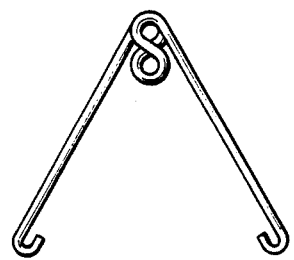
Fig. 13    Fig. 12
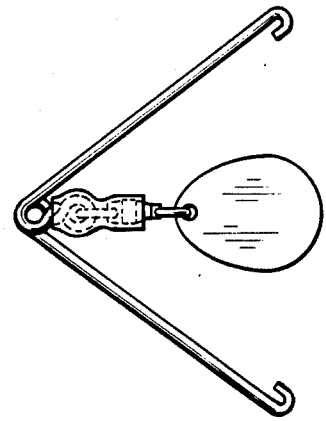
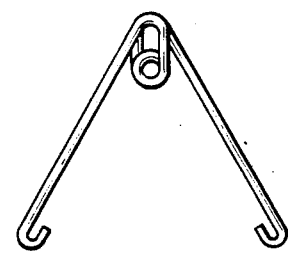
Fig. 15    Fig. 14

FISHING LURE DEVICE

This application is a continuation of 456,565, filed Jan. 10, 1983, now abandoned.

BACKGROUND OF THE INVENTION

1. Field of the Invention:

This invention relates to a fishing lure device. More specifically, the invention relates to a wire structure useful in conjunction with a plurality of artificial fishing lures.

2. Description of the Prior Art:

The basic concept of providing a wire structure to simultaneously hold more than one fishing hook is generally known. Historically such devices have been proposed and employed for a variety of purposes with varying degrees of success. For example, a weedless fishing hook structure involving one or more hooks at the end of a spring wire structure which holds the hooks in a protected configuration until a fish strikes is disclosed in U.S. Pat. No. 1,262.039. In U.S. Pat. No. 1,320,570 a stiff V-shaped leader is described wherein the apex of the V attaches to the fishing line and each trailing arm of the V is equipped with an artificial lure. In U.S. Pat. No. 2,479,484 a dual fishing hook structure is described involving a highly complex bent spring mechanism that again releases the hooks when a fish strikes the lure. While in U.S. Pat. No. 3,500,573 a weighted V-shaped underwater fishing lure and in U.S. Pat. No. 3,673,726 a floating V-shaped fishing lure each having a twisted loop eyelet at the point of the V such as to attach to the fishing line can be found.

SUMMARY OF THE INVENTION

In view of the prior art fishing devices, I have discovered an improved V-shaped multiple fishing lure fastener that can be made by selectively bending and twisting a single piece of wire. The multiple fastener has the ability to attach to a single fishing line and hold up to three individual artificial lures, fish hooks, spinners or the like. Thus, the present invention provides a multiple fishing lure fastening means comprising a single continuous rigid wire structure bent such as to generally form a V-shaped configuration wherein the end of each arm of the V-shaped configured wire is further bent such as to provide an attachment means for securing a fishing hook or artificial fishing lure at the end of each of the arms and wherein the V-shaped configured wire is further bent to provide an attachment means at the apex of the V-shaped wire structure adapted to simultaneously fasten to a fishing line and to a third fishing hook, artificial fishing lure or fishing spinner. The attachment means located at the apex of the V-shaped wire structure of the present invention can be a figure eight design having a 360°, 270° or 180° twist, an elongated loop, or an elongated loop with a smaller circular loop at the trailing end.

The method of manufacturing the figure eight twisted wire structure according to the present invention involves the steps of:

(a) wrapping an essentially straight wire partially around one of two parallel pins wherein the parallel pins are spaced apart by a distance corresponding to the desired length of the longitudinal axis of the figure eight;

(b) continuing the wrapping of the wire around the second parallel pin and back to the first parallel pin such as to form the desired V-shaped wire structure having an oval shaped loop bisecting the angle of the V-shaped structure;

(c) compressing the portion of the wire loop in contact with the first pin at the apex of the V-shaped structure; and (d) rotating the second pin relative to the first pin about the longitudinal axis of the loop thus creating a figure eight twist.

The present invention further provides that the movement and motion of a fishing swivel attached to the centrally located third lure or spinner attachment position directly behind the apex of the V be restricted by the use of an elastomeric or heat shrunk polymer sleeve partially surrounding the attachment means and fishing swivel.

It is a primary object of the present invention to provide a multiple fishing lure fastener. It is a further object that the fastener be a generally V-shaped wire structure having fastening means at the point of the V that accommodates the attachment of a trailing fishing device. It is an associated object that this fastener be readily and economically manufactured by bending and twisting a single piece of wire. Fulfillment of these objects and the presence and fulfillment of additional objects will be apparent upon complete reading of the specification and claim when viewed in conjunction with the enclosed drawings.

BRIEF DESCRIPTION OF THE DRAWINGS

FIG. 1 is a side view of the multiple fishing lure fastener according to the present invention attached to two artificial lures and a centrally located swivel mounted spinner.

FIG. 2 is a side view of the multiple fishing lure fastener of FIG. 1 less the artificial lures and spinner.

FIG. 3 is a front view of the multiple fishing lure fastener of FIG. 2.

FIGS. 4 through 9 sequentially illustrate the method of manufacturing the multiple fishing lure fastener of FIG. 2.

FIG. 10 is an enlarged side view of a preferred figure eight twisted eyelet of the multiple fishing lure fastener of FIG. 2.

FIG. 11 is an enlarged side view of an alternate figure eight twisted eyelet.

FIGS. 12, 13 and 14 illustrate alternate embodiments of the multiple fishing lure fastener according to the present invention.

FIG. 15 is a side view of the multiple fishing lure fastener according to the present invention attached to a swivel mounted spinner having a shrinkable polymeric sleeve restricting motion of the swivel.

DESCRIPTION OF THE PREFERRED EMBODIMENTS

The multiple fishing lure fastener of the present invention, how it is made and how it differs from the previously known devices can perhaps be best explained by reference to the drawings. FIG. 1 illustrates a preferred wire fastener, generally designated by the numeral 10. This fastener 10 is generally a V-shaped wire structure having arms 12 and 14 that terminate with bent eyelets 16 and 18. At the apex or point of the V is a twisted figure eight eyelet 20. The leading loop 22 of the figure eight eyelet 20 is attachable to the fishing line while the rear loop 24 is attached to a fishing swivel 26. As illustrated, eyelets 16 and 18 attach individually to two artificial lures 28 and 30, while the central eyelet 24 and swivel 26 attach to a spinner 32.

FIG. 2 illustrates the fastener 10 of FIG. 1 less the artificial lure, spinner and swivel. FIG. 3 is a frontal or top view of fastener 10 as seen when looking directly at the point or apex of the V. As shown in FIG. 3, the arms 12 and 14 of the fastener 10 pass in front and behind each other at the apex in the process of forming the figure eight eyelet 20.

In order to make the fastener 10, both ends of the straight piece of wire 34 (see FIG. 4) are initially bent in a semi-open eyelet or hook form. The wire 34 (see FIG. 5) is then wrapped around the first pin 36 of a pair of parallel pins 36 and 38 as indicated by the dashed curved arrow. This circular bending motion is continued by wrapping wire 34 around the second pin 38 (see FIG. 6) and a second time around the pin pin 36, stopping at the desired angle (see FIG. 7). As indicated in FIGS. 8 and 9, a compression force is then applied via plates 40 and 42 to that portion of the loop 44 wrapped around pin 36 corresponding to the apex of the V. The second pin 38 is then rotated about the longitudinal axis of the loop. As the second pin 38 rotates, a corresponding figure eight twist is induced in the loop.

The angle through which this final twisting motion is performed determines the nature of the figure eight and central attachment means. If a full 360° twist is employed, the figure eight as shown in FIG. 10 is produced. A 270° twist creates a twisted wire configuration as shown in FIG. 11. A 180° twist produces a simple figure eight as shown in FIG. 12, while no twist creates an elongated loop of FIG. 13. As a further alternative, an intermediate 360° bend encircling pin 38 without further axial twist of pin 38 produces an elongated loop with a smaller circle eyelet as shown in FIG. 14.

In manufacturing the wire fastener, various modifications can be employed. For example, the initial hook eyelet at the end of the arms can optionally be bent after forming the rest of the wire fastener. Also, the eyelets can be open hooks as illustrated in the drawings or closed circular bends. The angle associated with the overall V-shaped structure can be arbitrarily selected including having the figure eight central fastener extending beyond the apex or point of the V. Also, the relative direction of the final axial twist to create the decisive figure eight can be either clockwise or counterclockwise.

In using the multiple fishing lure fastener, the fishing line is attached to the front portion of the central fastener such as to pull the wire structure through the water with the arms trailing behind. Preferably, two individual artificial lures are attached to the eyelets at the end of each arm, however, various fishing devices can be employed including by way of example, but not limited thereto, hooks, swivels, leaders, weights, other fishing line or the like. Similarly, the same variety of fishing devices can be attached to the central fastener means. Preferably, a swivel with spinner is attached between the artificial lures. As shown in FIG. 15, a small polymeric sleeve can be advantageously slipped over the central fastener means and the front of the swivel and heat shrunk in place. In this manner, the degree of motion of the spinner is highly restricted to a region between the lures reducing the tendency of the spinner to interfere with the lures. Alternatively, an elastomeric tube or sleeve can be used rather than the polymeric sleeve.

Having thus described the invention with a certain degree of particularity, it is manifest that many changes can be made in the details of construction and arrangement of components without departing from the spirit and scope of this disclosure. Therefore, it is to be understood that the invention is not limited to the embodiment set forth herein for purposes of exemplification, but is to be limited only by the scope of the attached claim, including a full range of equivalents to which each element thereof is entitled.

I claim:

1. A method of manufacturing a V-shaped bent wire structure with a figure eight twist at the apex of said V-shaped structure comprising the steps of:
   (a) wrapping an essentially straight wire partially around one of two parallel pins wherein said parallel pins are spaced apart by a distance corresponding to the desired length of the longitudinal axis of said figure eight;
   (b) continuing the wrapping of said wire around said second parallel pin and back to said first parallel pin such as to form said desired V-shaped wire structure having an oval shaped loop bisecting the angle of said V-shaped structure;
   (c) compressing the portion of said wire loop in contact with said first pin at said apex of said V-shaped structure; and
   (d) rotating said second pin relative to said first pin about the longitudinal axis of said loop thus creating a figure eight twist.

* * * * *